US007404545B2

(12) United States Patent  
Steiner et al.

(10) Patent No.: US 7,404,545 B2
(45) Date of Patent: Jul. 29, 2008

(54) SPARE TIRE CARRIER HAVING OVERLOAD PROTECTION WITH CONTROLLED CABLE PAYOUT

(75) Inventors: Walter J. Steiner, Rochester Hills, MI (US); Anthony Paul Voegeli, Jr., Rochester Hills, MI (US); Jeffrey Michael Stephens, Lake Orion, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 11/216,428

(22) Filed: Aug. 31, 2005

(65) Prior Publication Data

US 2006/0169958 A1   Aug. 3, 2006

Related U.S. Application Data (60) Provisional application No. 60/606,443, filed on Aug. 31, 2004.

(51) Int. Cl.
*B66D 1/00* (2006.01)
*B62D 43/00* (2006.01)
(52) U.S. Cl. ........................... 254/323; 414/463
(58) Field of Classification Search .......... 254/323, 254/378; 414/463, 466
See application file for complete search history.

(56) References Cited

U.S. PATENT DOCUMENTS 4,059,197 A * 11/1977 Iida ........................... 414/463
4,535,973 A *  8/1985 Dorr et al. .................. 254/323
4,544,136 A * 10/1985 Denman et al. ............. 254/323

(Continued)

Primary Examiner—Evan H Langdon
(74) Attorney, Agent, or Firm—Kevin S. MacKenzie; Gifford, Krass, Sprinkle, Anderson & Citkowski, PC.; Dean B. Watson (57) ABSTRACT

A tire carrier assembly includes a rotation shaft and a housing have a bottom wall including a first aperture for receiving the rotation shaft. The housing also includes a sidewall extending upward from the bottom wall defining an interior space. The sidewall includes inner and outer surfaces. A sheave is disposed within the interior space of the housing and has a second aperture that receives the rotation shaft. The sheave also includes a gear member associated with it. Also included is a torque plate having a base, the base having opposing first and second surfaces and a third aperture formed therein. The third aperture has a gear portion formed around a periphery of the aperture. The torque plate also includes an arm portion projecting radially from the base. The gear portion of the torque plate is in operable engagement with the gear member of the sheave. An eccentric bushing having first and second opposing surfaces and an integrally formed bounding wall includes a fourth aperture receiving the rotation shaft. The first surface includes a cam formed thereon. The cam is positioned within the third aperture of the torque arm. A cable guide is positioned within the internal space of the housing and is located radially outboard relative to the sheave for positioning a cable about the sheave. The cable guide includes a lobe formed thereon for contacting a cable. A cover plate having a fifth aperture formed therein receives the rotation shaft. The cover plate is attached to the housing. The tire carrier assembly includes a frangible component that breaks upon the application of a predetermined force allowing the torque plate to freely rotate about the rotation shaft wherein the arm portion of the torque plate engages the inner surface of the sidewall of the housing allowing a controlled payout of cable wound about the sheave.

14 Claims, 6 Drawing Sheets

U.S. PATENT DOCUMENTS

| | | | |
|---|---|---|---|
| 4,625,947 A * | 12/1986 | Denman et al. | 254/323 |
| 4,997,164 A * | 3/1991 | Kito et al. | 254/323 |
| 5,251,877 A * | 10/1993 | Rempinski et al. | 254/323 |
| 5,368,280 A * | 11/1994 | Ng | 254/376 |
| 5,415,377 A * | 5/1995 | Britt et al. | 254/323 |
| 6,132,162 A * | 10/2000 | Kito et al. | 414/463 |
| 6,409,454 B1 * | 6/2002 | Yamamoto | 414/463 |
| 6,554,253 B1 * | 4/2003 | Dobmeier et al. | 254/323 |
| 6,923,394 B2 * | 8/2005 | Goldstein | 242/323 |

* cited by examiner

SPARE TIRE CARRIER HAVING OVERLOAD PROTECTION WITH CONTROLLED CABLE PAYOUT

REFERENCE TO RELATED APPLICATIONS

This application claims priority to U.S. Provisional application No. 60/606,443 filed Aug. 31, 2004.

FIELD OF THE INVENTION

The invention relates to spare tire carriers, and more particularly to spare tire carriers having overload protection.

BACKGROUND OF THE INVENTION

Various spare tire carriers have been utilized in the past and are well known in the art. Typically, spare tire carriers are designed to hold a spare wheel below the body frame of a vehicle. Generally, the spare tire carrier includes a cable associated with a winch or drive mechanism to raise and lower the tire when needed. Various U.S. patents including U.S. Pat. Nos. 4,059,197; 4,535,973; 4,600,352; 4,625,947; 5,251,877; 5,265,708 and 5,415,377 are related to spare tire carrier designs.

However, none of these prior art designs teach or suggest a spare tire carrier having overload protection with a controlled cable payout. Specifically, there is a need in the art for a spare tire carrier wherein a cable is released allowing the tire to separate from the tire carrier mechanism at a predetermined load; thereby allowing the cable to unwind from a spool such that the cable is prevented from being exposed to high loading forces. Additionally, there is a need in the art for a controlled cable payout in which the rate of the release of the cable can be controlled to avoid a rapid uncontrolled movement of a spare tire.

SUMMARY OF THE INVENTION

A tire carrier assembly includes a rotation shaft and a housing having a bottom wall including a first aperture for receiving the rotation shaft. The housing also includes a sidewall extending upward from the bottom wall defining an interior space. The sidewall includes inner and outer surfaces. A sheave is disposed within the interior space of the housing and has a second aperture that receives the rotation shaft. The sheave also includes a gear member associated with it. Also included is a torque plate having a base, the base having opposing first and second surfaces and a third aperture formed therein. The third aperture has a gear portion formed around a periphery of the aperture. The torque plate also includes an arm portion projecting radially from the base. The gear portion of the torque plate is in operable engagement with the gear member of the sheave. An eccentric bushing having first and second opposing surfaces and an integrally formed bounding wall includes a fourth aperture receiving the rotation shaft. The first surface includes a cam formed thereon. The cam is positioned within the third aperture of the torque arm. A cable guide is positioned within the internal space of the housing and is located radially outboard relative to the sheave for positioning a cable about the sheave. The cable guide includes a lobe formed thereon for contacting a cable. A cover plate having a fifth aperture formed therein receives the rotation shaft. The cover plate is attached to the housing. The tire carrier assembly includes a frangible component that breaks upon the application of a predetermined force allowing the torque plate to freely rotate about the rotation shaft wherein the arm portion of the torque plate engages the inner surface of the sidewall of the housing allowing a controlled payout of cable wound about the sheave.

DETAILED DESCRIPTION OF THE PREFERRED EMBODIMENTS

Figure 1:
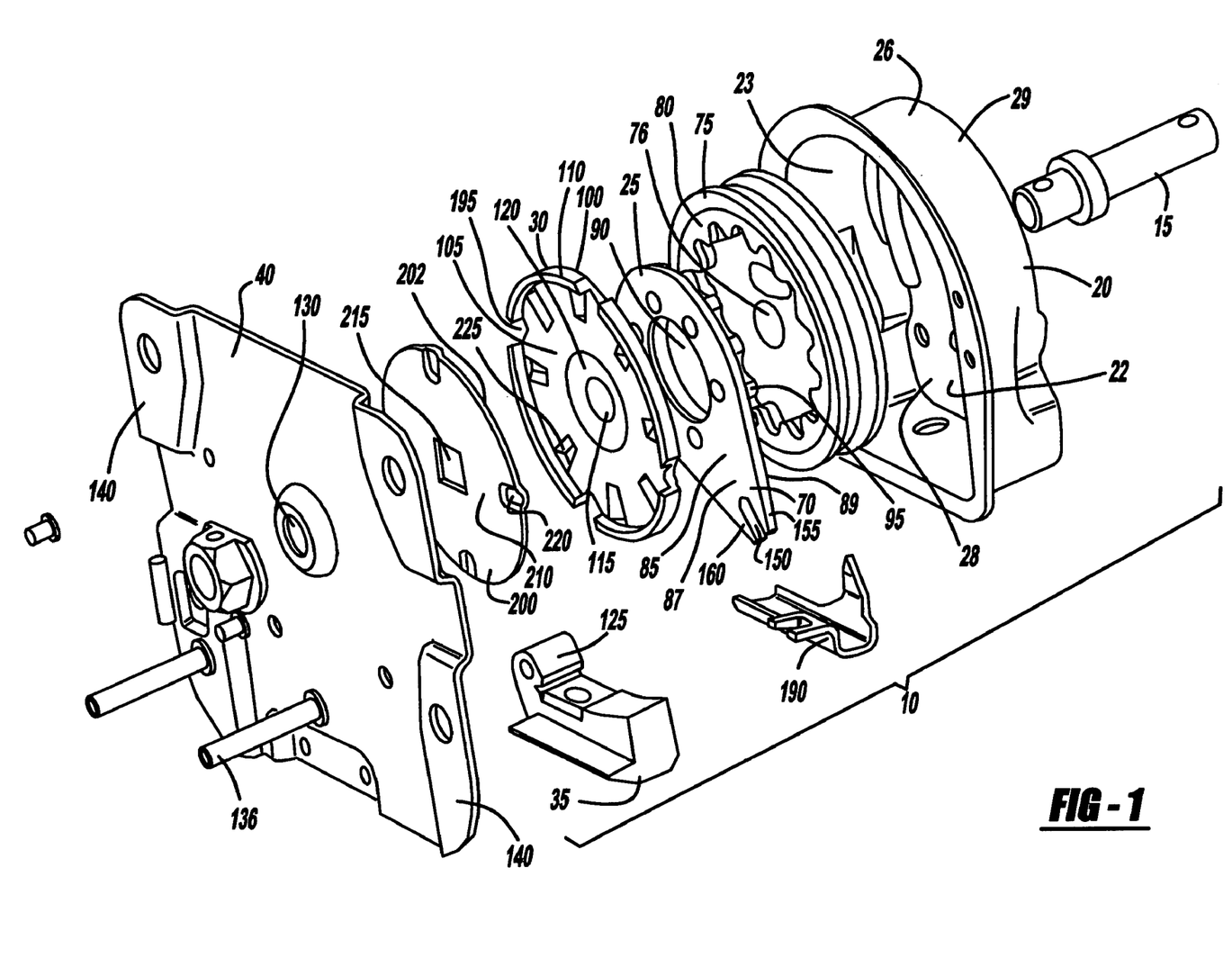
FIG. 1 is an exploded assembly view of a tire carrier assembly according to one embodiment of the present invention.

Referring to FIG. 1, there is shown a tire carrier assembly 10 according to the present invention. The tire carrier assembly 10 includes a rotation shaft 15, a housing 20, a torque plate 25, an eccentric bushing 30, a cable guide 35, a sheave 75 and a cover plate 40.

The housing 20 includes a bottom wall 22 having a first aperture 24 formed therein receiving the rotation shaft 15. The housing 20 also includes a sidewall 26 that extends upward from the bottom wall 22 and defines an interior space 28 of the housing 20. The sidewall 26 includes inner and outer surfaces 27, 29. Various versions of the housing 20 may be utilized by the present invention.

Figure 6:
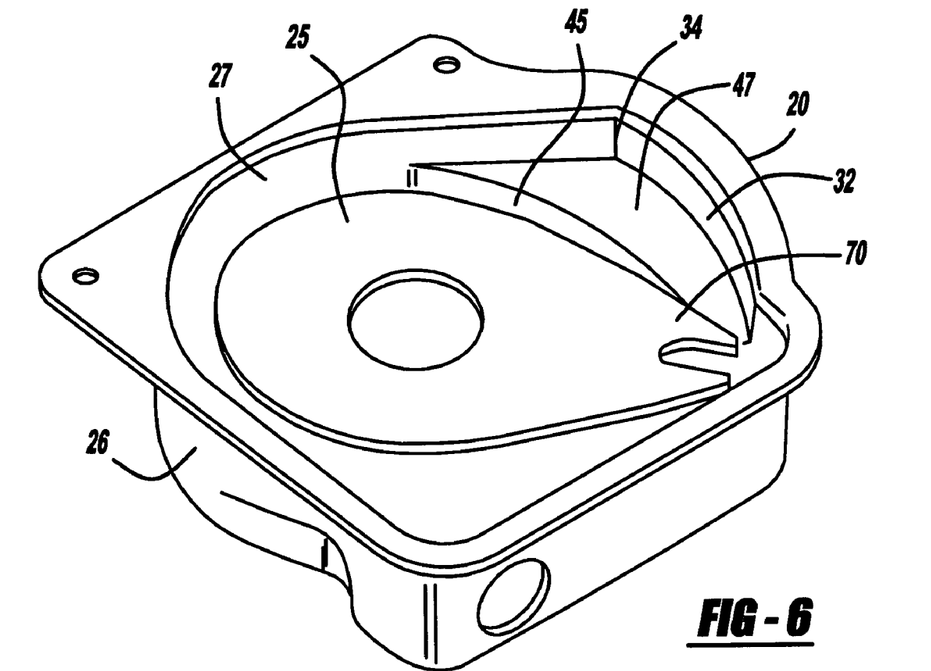
FIG. 6 is a perspective view of a torque plate and a first version of a housing.

A first version of the housing 20, as best seen in FIG. 6, includes an inner surface 27 of the sidewall 26 that has a curved profile 32. An arm portion 70 of the torque plate 25 travels on the curved profile 32 after the frangible component breaks, allowing a variable engagement of the arm portion 70 with the inner surface 27 of the housing 20, as will be described in more detail below. In one aspect of the present invention, the inner surface 27 of the sidewall 26 of the housing 20 includes an inwardly extending ledge 45 formed thereon. The ledge 45 includes a bottom surface 47. The bottom surface 47 depicted in FIG. 6 is of a relatively planar configuration, although other configurations may be utilized, as will be discussed below.

Figure 7:
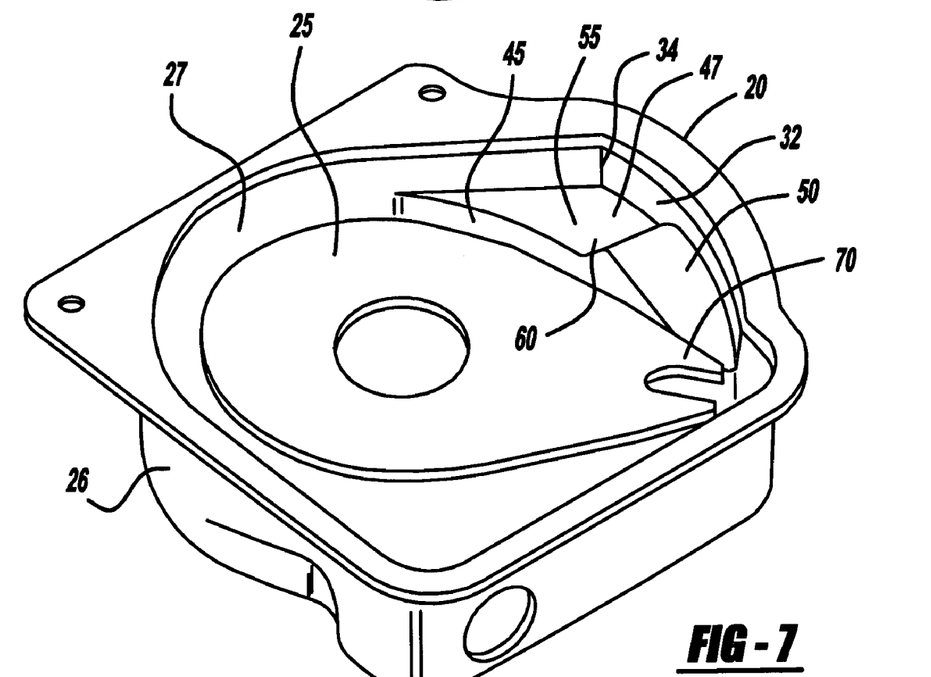
FIG. 7 is a perspective view of a torque plate and a second version of a housing.

A second version of the housing 20 according to the present invention is shown in FIG. 7. As with the first version of the housing 20, the inner surface 27 of the sidewall 26 includes a curved profile 32 and an inwardly extending ledge 45. However, in the second version depicted in FIG. 7, the bottom surface 47 of the ledge 45 includes first and second sections 50, 55. The first section 50 includes an upward incline with the second section 55 having a relatively planar configuration. The first section 50 is preferably positioned above and separated from the second section 55 by a step 60.

Figure 8:
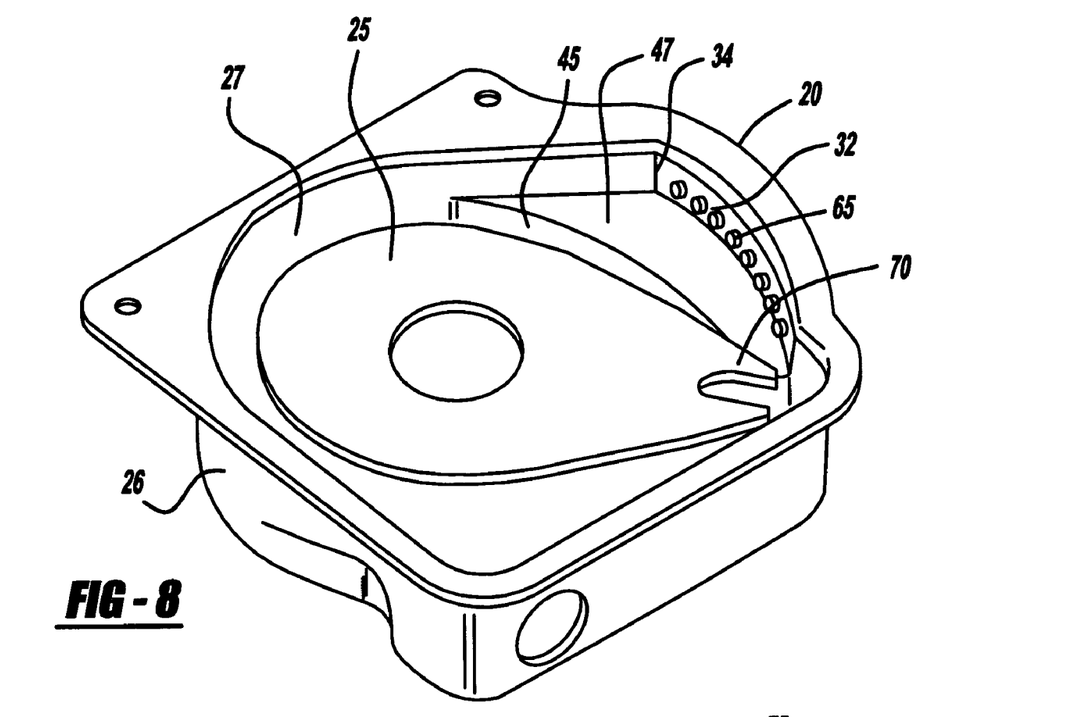
FIG. 8 is a perspective view of a torque plate and a third version of a housing.

A third version of the housing 20 is depicted in FIG. 8. The third version of the housing 20, as with the first and second versions, includes an inner surface 27 of a sidewall 26 having a curved profile 32, as well as an inwardly extending ledge 45 formed on the sidewall 26. The third version of the housing 20 includes a series of lobes or bumps 65 formed on the inner surface 27 of the sidewall 26. As can be seen in all three versions of the housing 20, the curved profile 32 terminates at a sharp angle 34. The sharp angle 34 provides a stop for engaging the arm portion 70 of the torque plate 25 when the torque plate 25 is allowed to freely rotate about the rotation shaft 15, as will be discussed in more detail below.

Returning to FIG. 1, a sheave 75 is disposed within the interior space 28 of the housing 20. The sheave 75 includes a second aperture 76 receiving the rotation shaft 15. Additionally, the sheave 75 includes a gear member 80 associated therewith. In one aspect of the invention, the gear member 80 is insert molded to bond the gear member 80 on an inner portion of the sheave 75.

The torque plate 25, having a base 85, is positioned adjacent the sheave 75. The base 85 of the torque plate 25 includes opposing first and second surfaces 87, 89 and also has a third aperture 90 formed therein. A gear portion 95 is formed about the third aperture 90 and is adapted to engage the gear member 80 of the sheave 75. The torque plate 25 also includes an arm portion 70 that projects radially from the base 85.

An eccentric bushing 30 having first and second opposing surfaces 100, 105 and an integrally formed bounding wall 110 is positioned adjacent the torque plate 25. The eccentric bushing 30 includes a fourth aperture 115 receiving the rotation shaft 15. The first surface 100 of the eccentric bushing 30 includes a cam 120 formed thereon. The cam 120 is positioned within the third aperture 90 of the torque plate 25.

A cable guide 35 is positioned within the internal space 28 of the housing 20 and is located radially outboard relative to the sheave 75 for positioning a cable about the sheave 75. The cable guide 35 includes a lobe 125 extending there from for contacting the cable to ensure proper winding of the cable about the sheave 75.

A cover plate 40 is disposed adjacent the eccentric bushing 30. The cover plate 40 includes a fifth aperture 130 formed therein that receives the rotation shaft 15. The cover plate 40 is attached to the housing 20 utilizing rivets 135 or other fasteners suitable for such a connection. As can be seen in FIG. 1, the cover plate 40 may include location ledges 140 formed thereon to provide location features when mounting the cover plate 40 to a vehicle. As stated above, the tire carrier assembly 10 of the present invention includes a frangible component that breaks upon application of a predetermined force, allowing the torque plate 25 to freely rotate about the rotation shaft 15, such that the arm portion 70 of the torque plate 25 engages the inner surface 27 of the sidewall 26 of the housing 20, allowing a controlled payout of cable wound about the sheave 75.

Figure 3:
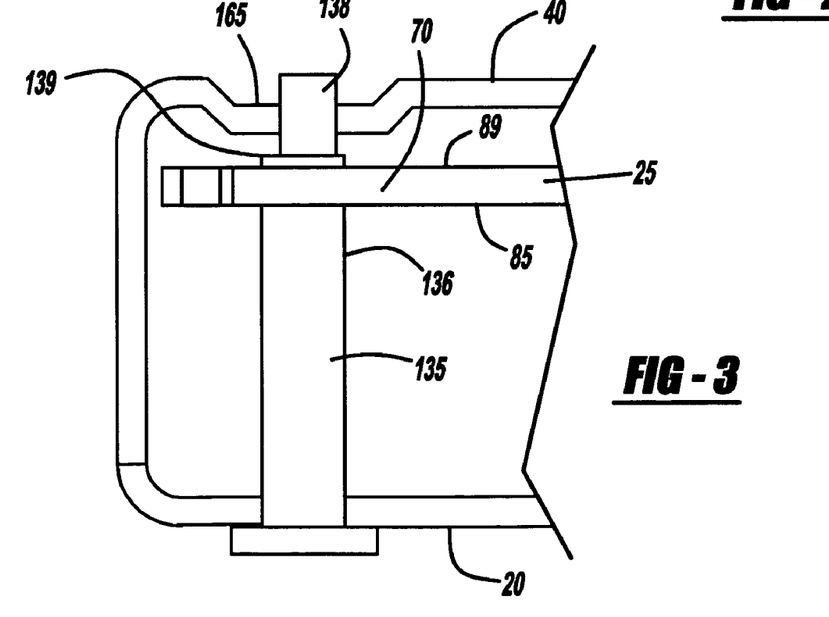
FIG. 3 is a partial front view of a housing and torque plate including a rivet according to a first embodiment of the present invention.
Figure 4:
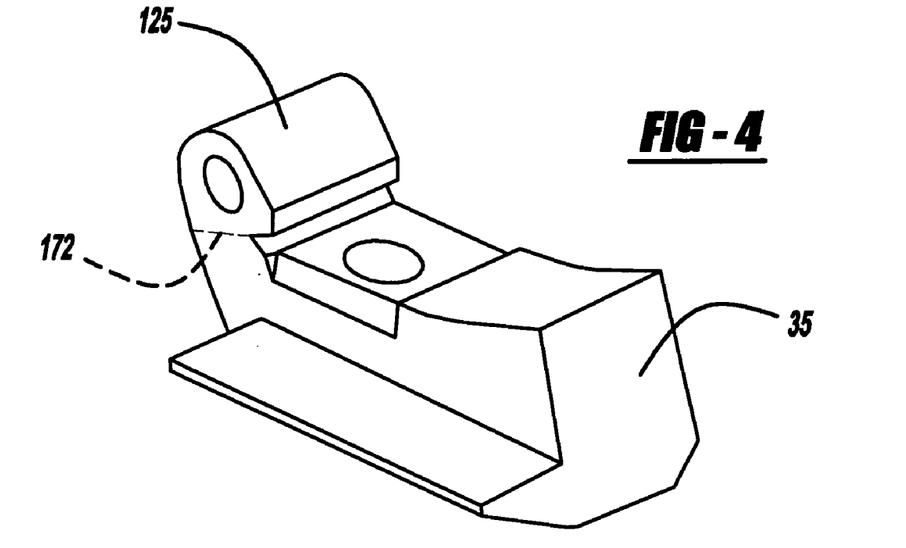
FIG. 4 is a perspective view of a cable guide according to a third embodiment of the present invention.

In a first embodiment of the tire carrier assembly 10, the arm portion 70 of the torque plate 25 includes a longitudinally extending notch 150 formed therein, defining a forward and trailing leg 155, 160 of the arm portion 70 of the torque plate 25. In this embodiment, as best shown in FIG. 3, a rivet 135 passes through the cover plate 40 and cable guide 35, such that the rivet 135 is positioned within the longitudinally extending notch 150 formed in the arm portion 70 of the torque plate 25. In this embodiment of the tire carrier assembly 10, the rivet 135 is the frangible component. As can be seen, the rivet 135 includes first and second concentric sections 136, 138 with the first section 136 having a larger diameter than the second section 138. The first and second sections 136, 138 are separated by a transition plane 139. In one aspect, the transition plane 139 of the rivet 135 is aligned with the second surface 89 of the base 85 of the torque plate 25, defining a shear plane, such that when a predetermined force is applied to the tire carrier assembly 10, the torque plate 25 breaks the rivet 135 along the shear plane. In this embodiment of the invention, the cover plate 40 may include a depression 165 formed about the rivet 135 that is received within the longitudinally extending notch 150 of the arm portion 70 of the torque plate 25. In this manner, one may align the transition plane 139 of the rivet 135 with the second surface 89 of the base 85 of the torque plate 25 to ensure a clean shear of the rivet 135, as opposed to bending of the rivet 135.

After the rivet 135 has been sheared, the torque plate 25 is free to rotate about the rotation shaft 15, as it is no longer constrained by the rivet 135 positioned within the longitudinally extending notch 150. As the torque plate 25 rotates, the arm portion 70 contacts the inner surface 27 of the housing 20, which thereby applies a controllable frictional resistance provided by the various versions of the housing 20, as described above. In this manner, the payout of the cable from the sheave 75 is controlled, as the gear portion 95 of the torque plate 25 is in operable engagement with the gear member 80 associated with the sheave 75.

Figure 2:
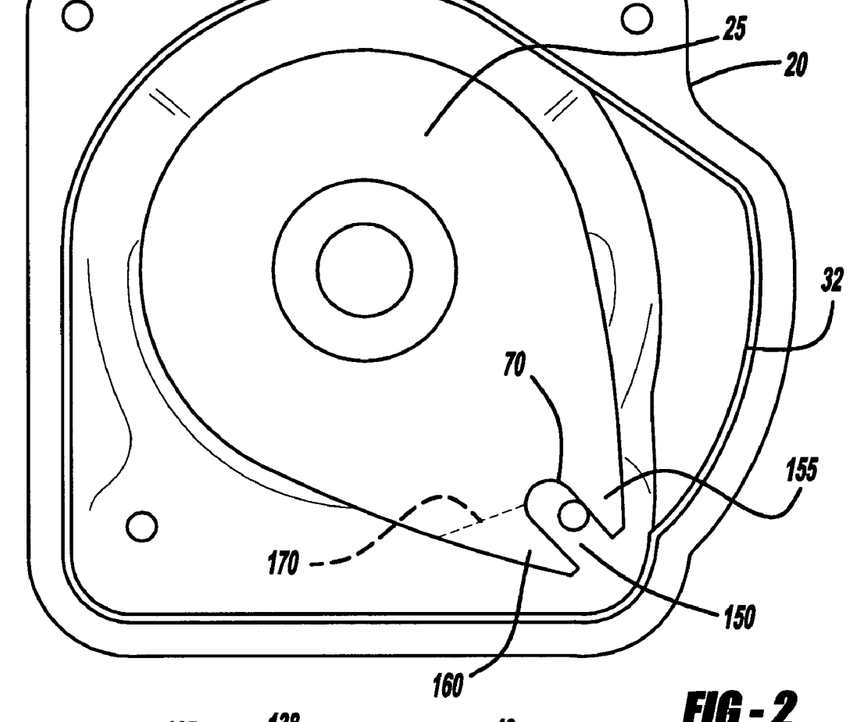
FIG. 2 is a plan view of the housing and torque plate of a first embodiment of a tire carrier.
Figure 5:
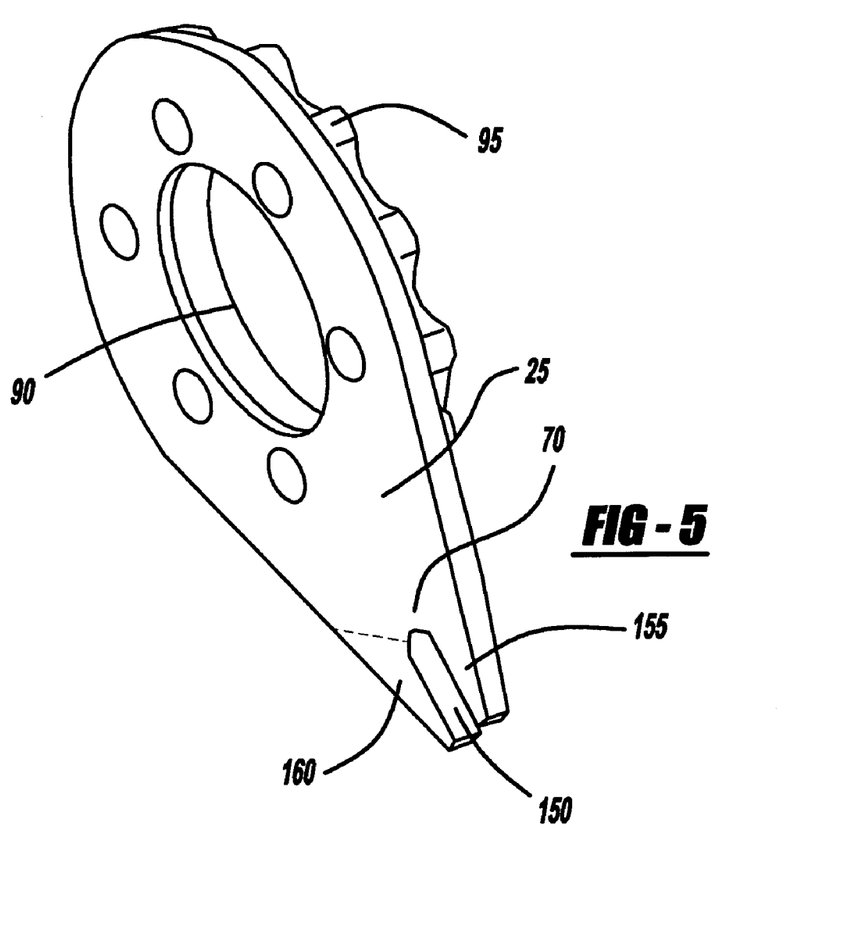
FIG. 5 is a perspective view of a torque plate according to a second embodiment of the present invention.

In a second embodiment of the tire carrier assembly 10 of the present invention, shown in FIG. 2, the trailing leg 160 of the arm portion 70 of the torque plate 25 is the frangible component, as opposed to the rivet 135 of the first embodiment. In this embodiment, the rivet 135 does not include the first and second concentric sections 136, 138 but is rather designed to withstand the shear forces applied to it by the torque plate 25. The arm portion 70 of the torque plate 25 in the second embodiment includes the forward and trailing legs 155, 160 separated by the longitudinal extending notch 150, as described above. In the second embodiment, the trailing leg 160 of the arm portion 70 contacts the rivet 135 when a predetermined force is applied to the tire carrier assembly 10, such that the trailing leg 160 breaks away from the torque plate 25. The trailing leg 160 may include a weakened portion 170, as disclosed in FIGS. 2 and 5. As described above, once the trailing leg 160 of the torque plate 25 is sheared, the torque plate 25 is allowed to freely rotate about the rotation shaft 15, such that the forward leg 155 of the torque plate 25 contacts the inner surface 27 of the housing 20, as described above.

Figure 9:
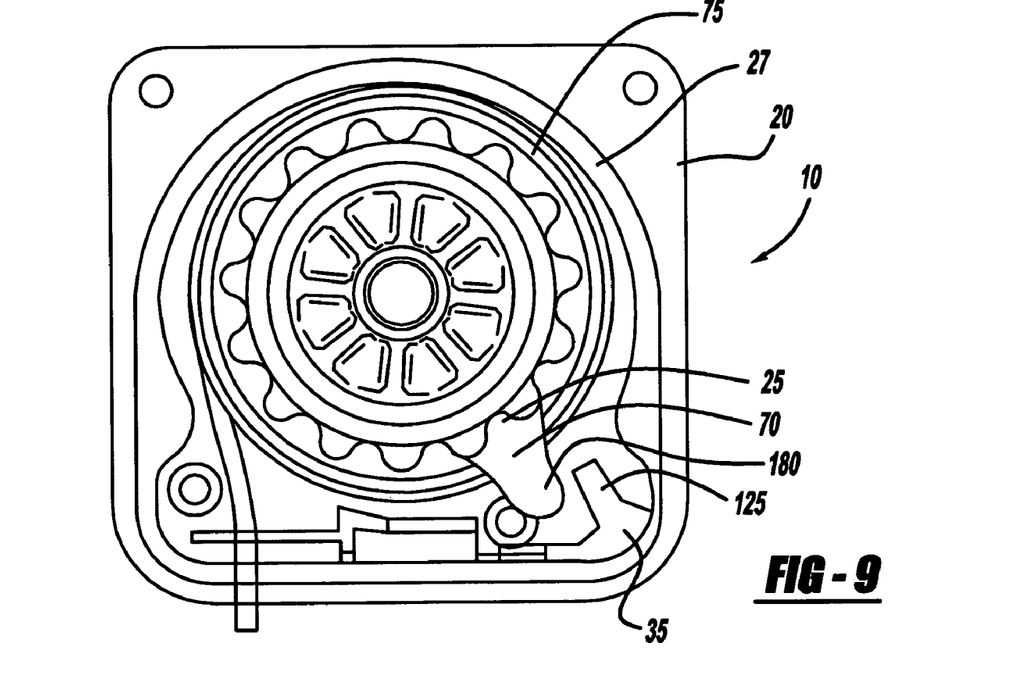
FIG. 9 is a plan view of a third embodiment of the tire carrier assembly of the present invention.

Referring to FIG. 9, there is shown a third embodiment of a tire carrier assembly 10 according to the present invention. The third embodiment includes the torque plate 25, sheave 75, housing 20, cover plate 40 and eccentric bushing 30 described above. However, the arm portion 70 of the torque plate 25 does not include a longitudinally extending notch 150 defining trailing and forward legs 155, 160 of the arm portion 70. Additionally, the rivet 135 passing through the cover plate 40 does not contact the torque plate 25 and is not positioned within the longitudinally extending notch 150, as described relative to the first and second embodiments. In the third embodiment, the arm portion 70 of the torque plate 25 includes a single lobe 180 that is free to rotate and contacts a lobe 125 formed on the cable guide 35 preventing rotation of the torque plate 25. In this embodiment of the tire carrier assembly 10, the arm portion 70 of the torque plate 25 contacts the lobe 125 formed on the cable guide 35 when a predetermined force is applied to the tire carrier assembly 10, such that the lobe 125 on the cable guide 35 breaks. In this embodiment, the lobe 125 formed on the cable guide 35 is the frangible component. As with the previously described embodiments, once the torque plate 25 is free to rotate about the rotation shaft 15, the arm portion 70 contacts the inner surface 27 of the housing 20, as described above. As with the second embodiment wherein the trailing leg 160 may include a weakened zone or break point 170, the cable guide 35 may also include a weakened zone or break point 172, such that the lobe 125 shears at a specific location allowing for free rotation of the torque plate 25 about the rotation shaft 15.

Referring to FIG. 1, the tire carrier assembly 10 of the present invention may further include optional components, such as an anti-rotation member 190 that is positioned on the cable guide 35 and intersects with notches 195 formed on the integrally formed bounding wall 110 of the eccentric bushing 30 once the cable has completely paid out from the sheave 75. The anti-rotation member 190 prevents the cable from back winding upon the sheave 75 after it has been released.

Additionally the tire carrier assembly 10 of the present invention may further include a clutch plate 200 that is adapted to releasably engage the eccentric bushing 30 to allow slip if an excessive force is applied to the rotation shaft 20. As shown in FIG. 1, the clutch plate 200 includes front and rear surfaces 205, 210 and a central aperture 215. The front surface 205 includes raised areas 220 formed about a peripheral edge that mates with detents 225 formed on the eccentric bushing 30. This design allows the clutch plate 200 to slip where a sufficient torque is applied to release the raised areas 220 from the detents 225.

It should be realized that any of the first, second, or third embodiments of the tire carrier assembly 10 can be used with any of the versions of the housing 20, described above. As described above, the tire carrier assembly 10 of the present invention allows for the controlled payout of cable from the sheave 75. The rate at which cable is paid out can be controlled by changing the curvature of the inner surface 27 of the housing 20, as well as the shape and thickness of the lobes 65 formed on the inner surface 27 of the housing 20. Additionally, the rate can be controlled by adjusting the size and steepness of the first section 50 of the bottom surface 47 of the ledge 45 which varies the frictional resistance applied to the torque plate 25. In this manner, various tire carrier assemblies 10 for different vehicles can be tuned to adjust the payout of cable to a specific level associated with a tire of that vehicle.

Figure 10:
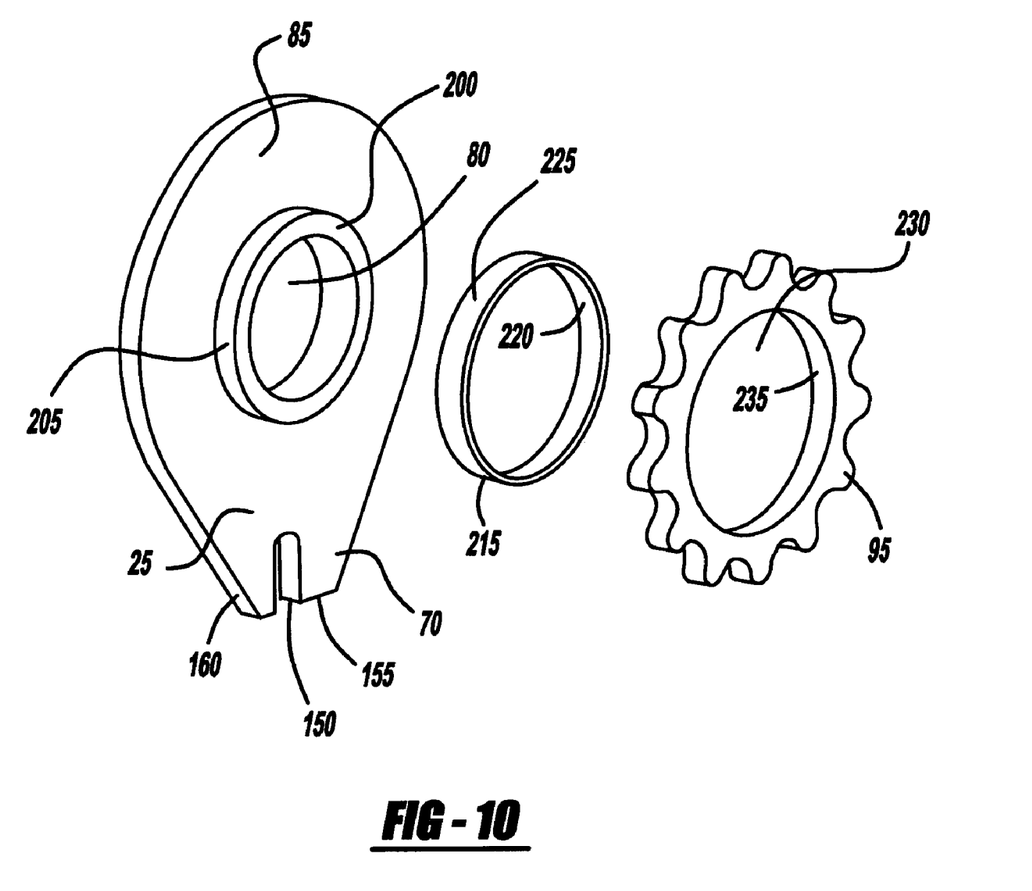
FIG. 10 is a perspective view of a torque plate according to a fourth embodiment of the present invention.

Referring to FIG. 10, there is shown a fourth embodiment of a tire carrier assembly 10 according to the present invention. The fourth embodiment includes the torque plate 25, sheave 75, housing 20, cover plate 40 and eccentric bushing 30 described above. As with the previously described first and second embodiments, the torque plate 25, includes a base 85, and is positioned adjacent the sheave 75. The base 85 of the torque plate 25 includes opposing first and second surfaces 87, 89 and also has a third aperture 90 formed therein. The torque plate 25 also includes an arm portion 70 that projects radially from the base 85. In a first embodiment of the tire carrier assembly 10, the arm portion 70 of the torque plate 25 includes a longitudinally extending notch 150 formed therein, defining a forward and trailing leg 155, 160 of the arm portion 70 of the torque plate 25. As previously described above, a rivet 135 passes through the cover plate 40 and cable guide 35, such that the rivet 135 is positioned within the longitudinally extending notch 150 formed in the arm portion 70 of the torque plate 25.

However, the torque plate 25 of the fourth embodiment includes a raised ridge 200 formed about the third aperture 90. The raised ridge 200 includes inner and outer contact surfaces 205, 210. A slip ring 215 having inner and outer contact surfaces 220, 225 is positioned about the raised ridge 200, such that the inner contact surface 220 of the slip ring 215 contacts the outer surface 210 of the raised ridge 200. The gear portion 95 that is adapted to engage the gear member 80 of the sheave 75 includes an aperture 230 that has an inner contact surface 235. The gear portion 95 is positioned about the slip ring 215, such that the inner contact surface 235 of the gear portion 95 engages the outer contact surface 220 of the slip ring 215.

In the fourth embodiment, the tire carrier assembly 10 does not include a frangible component as described above, allowing the torque arm 25 to freely spin and contact the housing 20. Rather, the torque plate 25, slip ring 215 and gear portion 95 are assembled such that the gear portion 95 slips relative to the torque plate 25 when a predetermined force is applied. The predetermined force can be varied for use with a variety of tire carrier designs, by varying the interaction of the torque plate 25, slip ring 215, and gear portion 95. The torque plate remains in a fixed position, due to the positioning of the rivet 135 within the longitudinally extending notch 150. The slipping of the gear portion 95 allows the cable to payout from the sheave 75. The gear portion 95 will continue to slip until a force applied to the tire carrier 10 is less than the predetermined force.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A tire carrier assembly comprising:
a housing;
a sheave disposed within the housing, the sheave including a cable wound about the sheave;
a torque plate including an arm portion;
a force responsive component having a first state regulating free rotation of the sheave wherein the sheave moves eccentrically and the force responsive component includes a second state initiated by reaction to application of a predetermined force wherein the sheave moves non-eccentrically rotatively and the torque plate is allowed to rotate about a rotation shaft wherein the arm portion of the torque plate engages the housing applying a resistance hindering free rotation of the sheave allowing a controlled payout of cable wound about the sheave.

2. The tire carrier assembly of claim 1 wherein the force responsive component includes a frangible component that breaks in response to application of the predetermined force.

3. The tire carrier assembly of claim 1 wherein the housing includes a curved profile wherein the aim portion of the torque plate travels on the curved profile after the force responsive component reacts allowing a variable engagement of the torque arm with the housing.

4. The tire carrier assembly of claim 3 wherein the curved profile terminates at an angle providing a stop for the rotational movement of the torque plate.

5. The tire carrier assembly of claim 1 wherein the housing includes an inwardly extending ledge formed thereon, the ledge including a bottom surface.

6. The tire carrier assembly of claim 1 wherein the arm portion of the torque plate includes a longitudinally extending notch formed therein defining forward and trailing legs on the arm portion of the torque plate and including a rivet further defining the force responsive component positioned within the longitudinally extending notch formed in the arm portion of the torque plate wherein the rivet includes first and second concentric sections, the first section having a larger diameter than the second section, the first and second sections separated by a transition plane.

7. The tire carrier assembly of claim 6 wherein the transition plane of the rivet is aligned with the torque plate defining a shear plane such that when the predetermined force is applied to the tire carrier assembly, the torque arm breaks the rivet along the shear plane.

8. The tire carrier assembly of claim 1 including an eccentric bushing having first and second opposing surfaces and an integrally formed bounding wall, the eccentric bushing including a cam formed thereon, the cam positioned to contact the torque arm.

9. The tire carrier assembly of claim 8 including an anti-rotation member positioned on a cable guide, the anti-rotation feature intersecting with notches formed on the integrally formed bounding wall of the eccentric bushing when the cable has completely paid out from the sheave.

10. The tire cater assembly of claim 8 further including a clutch plate adapted to releasably engage the eccentric bushing for allowing slip if an excessive force is applied to the rotation shaft.

11. A tire carrier assembly comprising:

a support;

a sheave supported on the support, the sheave including a cable wound about the sheave;

a force responsive-component having a first state regulating free rotation of the sheave wherein the sheave moves eccentrically and a second state initiated by application of a predetermined force wherein the sheave moves non-eccentrically rotatively and includes overload protection that allows the cable to payout in a controlled manner from the sheave upon the application of the predetermined force.

12. The tire carrier assembly of claim 11 including a force responsive component including a frangible component that breaks in response to application of the predetermined force.

13. The tire carrier of claim 11 including a torque plate having a gear portion and an arm portion, the gear portion of the torque plate in operable engagement with a gear member of the sheave.

14. The tire carrier assembly of claim 13 wherein the support includes a component selected from: a) a housing having a curved profile wherein the arm portion of the torque plate travels on the curved profile after the force responsive component reacts allowing a variable engagement of the torque arm with the housing, b) a housing having an inwardly extending ledge formed thereon, the ledge including a bottom surface having first and second sections, the first section having an upward incline and the second section having a planar configuration, the first section positioned above and separated from the second section by a step, and c) a housing having a plurality of inwardly extending lobes formed thereon, wherein the arm portion of the torque plate contacts the lobes after the force responsive component reacts allowing a variable engagement of the torque arm with the housing.

* * * * *